Aug. 23, 1966 J. RYWAK 3,268,740
SHIFT REGISTER WITH ADDITIONAL STORAGE MEANS CONNECTED BETWEEN REGISTER STAGES FOR ESTABLISHING TEMPORARY MASTER-SLAVE RELATIONSHIP
Filed Nov. 6, 1963 2 Sheets-Sheet 1

Aug. 23, 1966 J. RYWAK 3,268,740

SHIFT REGISTER WITH ADDITIONAL STORAGE MEANS CONNECTED BETWEEN REGISTER STAGES FOR ESTABLISHING TEMPORARY MASTER-SLAVE RELATIONSHIP

Filed Nov. 6, 1963 2 Sheets-Sheet 2

3,268,740

SHIFT REGISTER WITH ADDITIONAL STORAGE MEANS CONNECTED BETWEEN REGISTER STAGES FOR ESTABLISHING TEMPORARY MASTER-SLAVE RELATIONSHIP

John Rywak, Ottawa, Ontario, Canada, assignor to Northern Electric Company Limited, Montreal, Quebec, Canada Filed Nov. 6, 1963, Ser. No. 321,883
8 Claims. (Cl. 307—88.5)

This invention relates to improvements in a shift register of the type consisting of an interconnected series of bistable elements. On receipt of a shift signal, the state of a first element is transferred to a second element, the state of the second element is transferred to a third element, and so on down the series. In one prior form of shift register a delay is provided in each transfer circuit between adjacent elements, to afford time for the second element to convey its state onwardly towards the third element before it is itself changed to correspond to the former state of the first element. This imposition of delay in the transfer circuits, together with the need to allow time for the delay networks to stabilize between shifts, places a limitation on the shifting speed of this type of register. The shifting speed is dictated by the characteristics of the delay networks rather than by the inherent switching speeds of the bistable elements themselves.

Shift registers have been designed to overcome this limitation by the use of two bistable elements per stage, one such element acting as a storage element. A first shift pulse transfers the state of the first register element to the storage element and then a second shift pulse transfers the state of the storage element to the second register element. In such a circuit the shifting speed is determined by the switching speeds of the bistable elements themselves, since the simple AND gates which are used to couple the bistable elements contribute negligible delay.

The present invention relates to this later type of shift register, namely one in which a storage bistable element is interposed between each pair of bistable elements of the register itself.

In prior forms of shift register employing a storage element between each pair of register elements, such storage element is effective only during each shifting period to receive the state of the first register element and forward such state to the second register element. These transfers are effected by AND gates interposed between the storage element and each register element and energized by shift pulses. Once each transfer process is complete, the storage element is fully isolated from the register elements, since both AND gates are automatically disabled in the absence of a shift pulse. As a result, should the state of one of the register elements be destroyed (as by an overload condition imposed at an output therefrom), there will be no means of reinstating such element and the resulting error will subsequently be transferred along the entire register.

The principal object of the present invention is to provide a shift register in which this disadvantage is avoided, each of the register elements being continuously urged into the state to which it has most recently been transferred, during the quiescent period following a shifting operation. Then, in the event of its state being changed over by an overload, it will be immediately and automatically re-instated as soon as the overload has been removed.

This object is preferably achieved by the use of novel gate means between the bistable elements. Each gate means is called upon to establish temporarily a master-slave relationship between a pair of elements, first such means establishing this relationship between a first register element and a storage element, and second such means establishing this relationship between the storage element and a second register element. By "master-slave relationship" reference is made to the fact that the master element controls the state of the slave element, i.e. transfers its state to the slave element, but that the slave element has no re-action on the master element. Another way of expressing this relationship is to say that each gate means becomes uni-directionally enabled at the appropriate times. The first gate means is enabled in this way by an "in-storage" pulse received from a shift control input and is later disabled by an "out-storage" pulse which enables the second gate means. It is, however, a feature of the second gate means that it remains enabled (that is the master-slave relationship between the storage and second register elements is maintained) during the quiescent period that follows the out-storage pulse. In this manner the second storage element is continuously urged into its acquired state and the object of the invention has been achieved. On receipt of the next in-storage pulse, the second gate means is temporarily disabled (the master-slave relationship is interrupted) while the in-storage operation is proceeding (transfer of state from the first register element to the storage element).

Preferably the in-storage and out-storage pulses will take the form of the leading and trailing edges respectively of a single shift pulse or change of potential at the shift control input.

One manner of carrying the invention into practice is illustrated diagrammatically in the accompanying drawings. It is to be understood that the specific circuits now to be described represent only an example of the invention and that the broad scope of the latter is defined by the appended claims.

Figure 1:
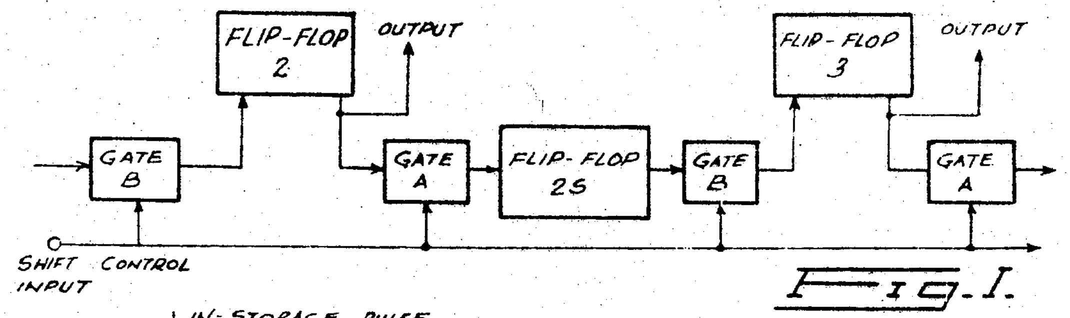
FIGURE 1 is a block diagram of a shift register according to the present invention.

FIGURE 1 shows two typical bistable elements of a shift register, in the form of flip-flop 2 and flip-flop 3, it being assumed that there will be at least one flip-flop of the register preceding flip-flop 2 and succeeding flip-flop 3. Flip-flops 2 and 3 are joined by a gate A, a flip-flop 2S and a gate B, both the gates being connected to receive pulses from a shift control input. The output of each of the register flip-flops 2, 3 feeds to the next gate A and is also available for external sampling of the stage of the register concerned in the usual way. Flip-flop 2 is shown receiving an input from a gate B of the previous stage.

Figure 2:
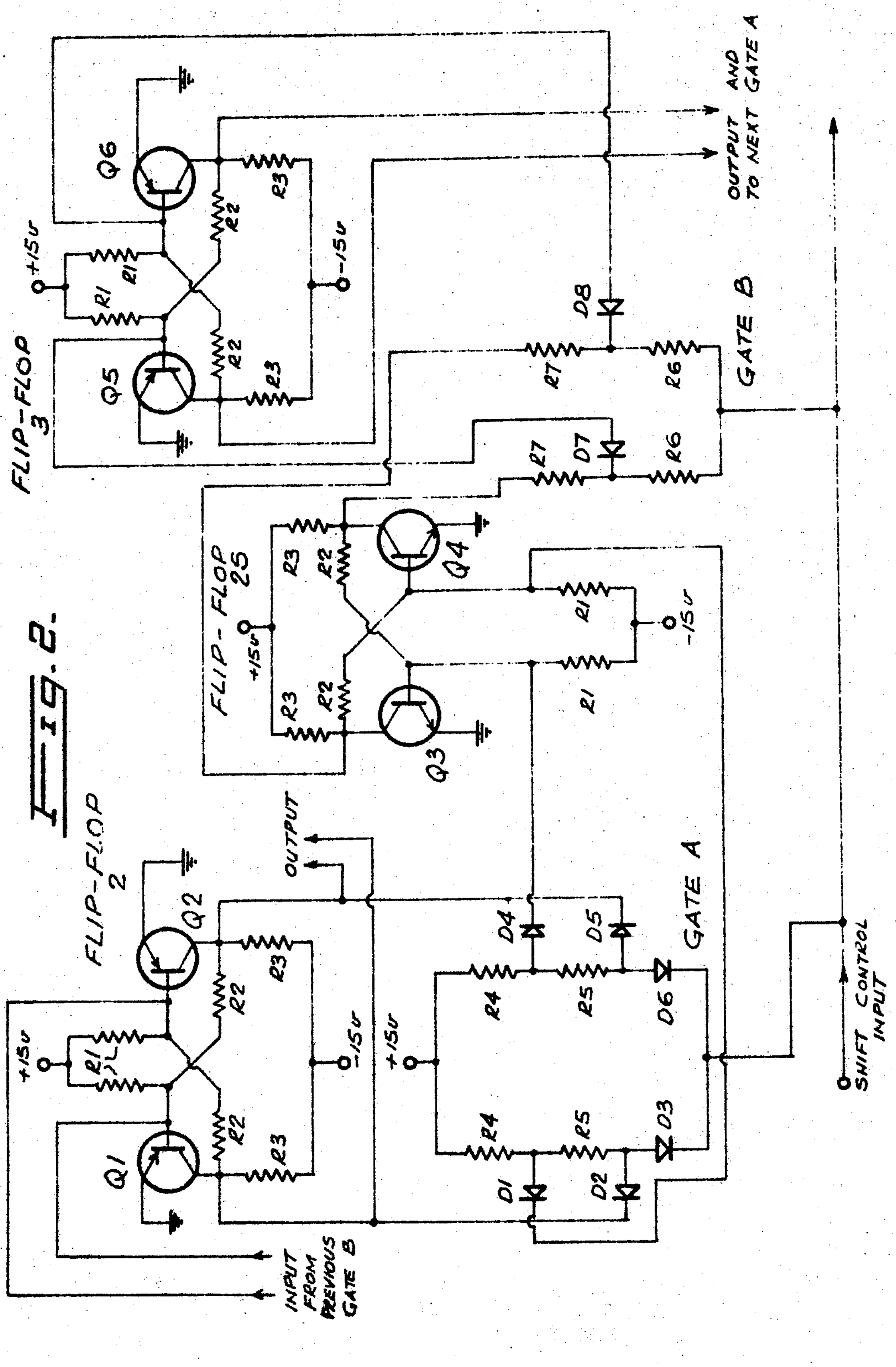
FIGURE 2 is a specific circuit corresponding to FIGURE 1.

A specific circuit following the block diagram of FIGURE 1 is illustrated in FIGURE 2. Flip-flop 2 (the first register element) is here shown as consisting of a pair of PNP transistors Q1 and Q2; flip-flop 2S (the storage element) consists of a pair of NPN transistors Q3 and Q4; and flip-flop 3 (the second register element) consists of a pair of PNP transistors Q5 and Q6. Each pair of transistors is connected in the well-known manner of a bistable circuit. Thus, when transistor Q2 is ON, its companion transistor Q1 is held OFF by a positive bias on its base, the flip-flop action being achieved by the cross-coupling of the collector and base electrodes of these transistors. This condition of flip-flop 2 (namely transistor Q2, ON) will be considered as the 0 state, as indicated in the table of FIGURE 3.

Flip-flop 3 consists of a similarly interconnected pair of transistors Q5 and Q6. It will be assumed that flip-flop 3 is initially in the 1 state, that is with transistor Q5 ON and the transistor Q6 accordingly held OFF. The storage flip-flop 2S is also in the 1 state, transistor Q4 being ON and transistor Q3 being OFF. Typical values for resistors R1 in flip-flops 2, 2S and 3 is 300 kilohms; for resistors R2 22 kilohms; and for resistors R3, 3.3 kilohms.

Figure 3:
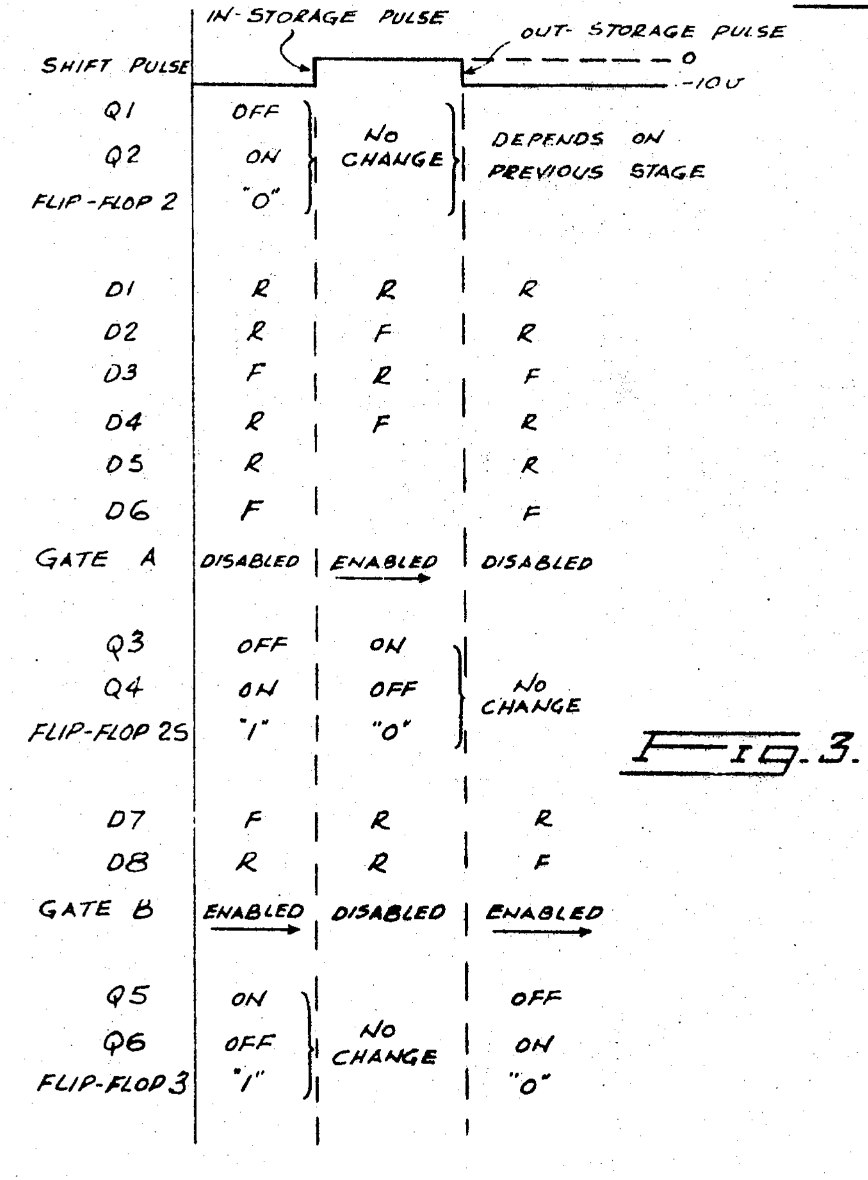
FIGURE 3 is an operational table.

Consider the state of the 6 diodes D1 and D6 of the resistance-diode network of gate A under the quiescent conditions shown on the left-hand column of the table of FIGURE 3. Resistors R4 are of greater value than resistors R5, for example, resistors R4 may be 22 kilohms and resistors R5, 10 kilohms each. During this quiescent period, a voltage of —10 volts is applied at the shift control input. As a result, diodes D3 and D6 are forward biased. Since transistor Q2 is ON, its collector is substantially at ground potential, so that diode D5 is reverse biased. Diode D2 is probably also reverse biased, although this depends upon whether the collector of transistor Q1 is more negative than —10 volts. The actual condition of diode D2 is unimportant at this time. Diode D1 is also reverse biased, since its cathode is connected to the base of transistor Q4, which is substantially ground potential (Q4 being conducting), whereas its anode is connected between resistors R4 and R5. Resistor R5 being less than half the value of resistor R4, the anode of diode D1 will be below ground potential. Diode D4 is similarly reverse biased. All these conditions are shown in the first column of conditions of the table of FIGURE 3, using the symbols F and R for forward and reverse bias, respectively. Since both diodes D1 and D4 (the only paths interconnecting gate A with flip-flop 2S) are reverse biased and hence non-conducting, gate A is disabled as far as having any effect on flip-flop 2S is concerned.

Consideration will now be given to the effect on the receipt of an "in-storage pulse" in the form of the leading edge of a shift pulse, or, in other words, the raising of the voltage at the shift control input to ground potential. The changes which result are shown symbolically in the second column of the table of FIGURE 3; they take place virtually instantaneously on change of the shift control potential. Diode D2 will become forward biased while diode D3 becomes reverse biased, the anode junction of diodes D2 and D3 assuming some negative voltage, since the value of resistor R3 is substantially less than the combined value of resistors R4 and R5. The diode D1 will remain reverse biased. The anode junction of diodes D5 and D6 will rise to ground potential while the anode of diode D4 will rise above ground potential, causing diode D4 to become forward biased and hence conducting. This action applies a positive pulse to the base of transistor Q3, turning this transistor ON. As soon as transistor Q3 conducts, its collector goes to approximately ground potential, and the base of transistor Q4 accordingly goes negative for the transistor to be shut OFF. The flip-flop 2S is thus changed over to its 0 state. During this time, gate A can be said to have been enabled uni-directionally, and flip-flops 2 and 2S in a master-slave relationship.

Also during this time gate B has been temporarily disabled by the fact that both diodes D7 and D8 will be reverse biased when the shift control voltage is at ground. Resistors R6 (typically 12 kilohms) are connected between the shift pulse input and each of the cathodes of the diodes D7 and D8, and resistors R7 (typically 8.2 kilohms) are connected between such cathodes and the respective collectors of transistors Q4 and Q3. Both cathodes are thus held positive.

At the trailing edge of the shift pulse, which constitutes an "out-storage pulse" (that is when the shift control voltage drops again to —10 volts) the conditions become those seen in the right-hand column of the table of FIGURE 3. Since transistor Q3 is now conducting, the end of the resistor R7 connected to its collector will be approximately at ground potential, while the corresponding end of the other resistor R7 connected to the collector of transistor Q4 will be at some positive potential. With the shift control back down to —10 volts, diode D7 will remain reverse biased (the positive potential from transistor Q4 prevailing, with the value of resistor R7 less than that of resistor R6), while diode D8 will become forward biased and send a negative going pulse to the base of transistor Q6 to turn that transistor ON. This action raises the voltage of the base of the transistor Q5 until the same is reverse biased and shut off. Flip-flop 3 has thus been changed over to its 0 state. During this time gate B can thus be said to have been enabled uni-directionally, and flip-flops 2S and 3 in a master-slave relationship.

During this second transfer period, diodes D1, D2, D4 and D5 of gate A are all reverse biased so that gate A is entirely disabled for communication in either direction between flip-flops 2 and 2S.

Since flip-flop 3 has now been transferred to its 0 state, the state of flip-flop 2 has been shifted to flip-flop 3. The state now occupied by flip-flop 2 will depend on the state that was transferred to it from the previous stage of the register by the same trailing edge of the shift pulse, that is by the so-called out-storage pulse.

It will also be noted that flip-flop 2S remains in the 0 state, the same state as flip-flop 3, and that gate B remains uni-directionally enabled by virtue of the forward bias which remains on diode D8. Now assume that the state of flip-flop 3 is changed by some external agency, such as the application of an overload to its output. As soon as the external overload is removed, flip-flop 3 will automatically return to its 0 state, because of the negative potential which continues to be applied to the base of transistor Q6 through the conducting diode D8. The interconnection between flip-flops 2S and 3 is uni-directional, since flip-flop 3 can never change the state of flip-flop 2S.

Assume that while these shifting operations were taking place flip-flop 2 was changed to its 1 state. Upon the occurrence of the next shift pulse, that 1 state will be conveyed through gate A to the storage flip-flop 2S on receipt of the leading edge of the shift pulse, and the now 1 state of flip-flop 2S will be transferred to flip-flop 3 through gate B on receipt of the trailing edge of the shift pulse. The manner in which these further shifts take place is analogous to that described, with the various diodes functioning in mirror image to that already described. For example, it will now be the diode D7 which remains forward biased to hold transistor Q5 ON when the quiescent conditions again prevail. Similarly, diodes D1 and D5 in gate A become forward biased on receipt of the leading edge of the shift pulse and perform the functions previously described as performed by diodes D2 and D4.

Although for convenience of illustration, the shift pulse has been shown in FIGURE 3 as a square wave with sharp leading trailing edges, it is a feature of the present construction that relatively slowly rising and falling shift pulse edges can be used without disadvantage. This has advantage in that the stray capacitances sometimes encountered with very sharp shift pulse edges are avoided.

It is a further feature of this circuit that flip-flops 2 and 3 can be made to work much harder than they would normally do as flip-flops. This effect is possible because, in their quiescent state, with the shift control input at —10 volts, the four transistors of the flip-flops 2 and 3 are acting as buffer amplifiers. It is impossible to turn over either of these flip-flops permanently by overloading it, as each is being continuously urged into its acquired state by the previous storage flip-flop acting through an enabled gate B.

Another feature of the circuit illustrated is that only a single pulse is required, its leading and trailing edges being used to perform the two in-storage and out-storage functions required for a single shift. Moreover, this effect is achieved without the use of any capacitors, with the result that the shifting speed of the register is determined solely by the switching speeds of the transistors and can therefore be made correspondingly high, if desired. The in-storage and out-storage pulses can be very close together and thus in practice a single short shift pulse is all that need be generated and transmitted to the gates and no need arises to coordinate the timing of a pair of separate pulses applied individually to different gates, as in prior art constructions.

I claim:

1. A shift register having first and second bistable register elements, a bistable storage element, first gate means for initially transferring the state of the first register element to the storage element, and second gate means for subsequently transferring the state of the storage element to the second register element; said second gate means including means for maintaining a master-slave relationship between the storage element and the second register element after said subsequent transfer and until the next transfer from the first register element to the storage element.

2. In a shift register (a) first and second bistable register elements,
(b) a bistable storage element,
(c) a shift control input,
(d) first gate means receiving pulses from said input and connected between the first register element and the storage element, and including means for establishing a master-slave relationship therebetween to transfer the state of the first register element to the storage element on receipt of an in-storage pulse from said input and for interrupting said relationship on receipt of a subsequent out-storage pulse from said input,
(e) and second gate means receiving pulses from said input and connected between the storage element and the second register element, and including means for establishing a master-slave relationship therebetween to transfer the state of the storage element to the second register element on receipt of an out-storage pulse from said input, for maintaining said relationship during a quiescent period following said out-storage pulse and for interrupting said relationship only on receipt of a subsequent in-storage pulse.

3. A shift register according to claim 2, wherein said in-storage and out-storage pulses comprise the leading and trailing edges respectively of a single shift pulse fed to both gate means.

4. A shift register according to claim 2, wherein each element comprises a pair of three electrode transistors intercoupled for bistable operation, all the transistors of the register elements being of a first conductivity type and both the transistors of the storage element being of the opposite conductivity type.

5. A shift register according to claim 2, wherein (a) said shift control input comprises a source of a first potential and, consequent upon said in-storage pulse, a second potential,
(b) said first gate means includes a source of a third potential, said second potential being intermediate in value said first and third potentials,
(c) and said first gate means further includes a resistance-diode network interconnecting said sources,
(d) a first pair of paths extending from said first register element to said network, each said path being series connected with a diode of said network.
(e) and a second pair of paths extending from said network to said storage element, each of said second pair of paths being series connected with a diode of said network, said first potential being of a value relative to said third potential and the potentials in said elements to reverse bias the diodes series connected in both paths of at least one of said pairs of paths to disable the first gate means,
(g) said second potential being of a value relative to said third potential and the potentials in said first register element to forward bias the diode in series with one of said first pair of paths, the path thus opened being determined by the state of said first register element,
(h) said second potential being of a value relative to said third potential and the potentials in said storage element to forward bias the diode in series with one of said second pair of paths, the second path thus opened being determined by the opened path of the first pair of paths,
(i) and said third potential being of a value relative to said second potential and the potentials in said storage element to act on said storage element through said second opened path to drive the same to a state determined by the state of the first register element.

6. A shift register according to claim 2 wherein (a) said shift control input comprises a source of a first potential and, consequent upon said in-storage pulse, a second potential,
(b) and second gate means includes a resistance-diode network,
(c) a first pair of paths extending from said storage element to said network,
(d) and a second pair of paths extending from said network to the second register element, each of said second pair of paths being series connected with a diode of said network,
(e) said second potential being of a value relative to the potentials in said elements to reverse bias the diodes in series with both said second paths to disable the second gate means,
(f) and said first potential being of a value relative to the potentials in said elements to forward bias the diode in series with one of said second pair of paths, the path thus opened being determined by the state of said storage element,
(g) said opened path acting on said second register element to drive the same to a state determined by the state of the storage element, and said path remaining open to continue to urge said second register element to its acquired state so long as said first potential prevails at said input.

7. A shift register comprising (a) first and second bistable register element,
(b) a bistable storage element intermediate said register elements,
(c) a shift control input comprising a source of a first and a second potential,
(d) first and second gate means,
(e) a first pair of paths extending from said first register element to said first gate means,
(f) a second pair of paths extending from said first gate means to said storage element,
(g) a third pair of permanently open paths extending from said storage element to said second gate means,
(h) and a fourth pair of paths extending from said second gate means to said second register element,
(i) said first potential being of a value relative to the potentials in said gate means and in said elements to hold closed both paths of at least one of said first and second pairs of paths to disable said first gate means and isolate said first register element and said storage element from each other, to open one of said fourth pair of paths, the path thus opened being determined by the state of said storage element, to drive said second register element to a state determined by the state of said storage element and to continue to urge said second register element into its acquired state.
(j) said second potential being of a value relative to the potentials in said gate means and in said elements to hold closed both paths of said fourth pair of paths to disable said second gate means and isolate said second register element and said storage element from each other, to open one path of each of said first and second pairs of paths, the paths thus opened being determined by the state of said first register element, to drive said storage element to a state determined by the state of said first register element.

8. A shift register comprising
(a) first and second bistable register elements,
(b) a bistable storage element intermediate said register elements,
(c) a shift control input comprising a source of a first and second potential,
(d) first gate means including a source of a third potential and a first resistance-diode network interconnecting said sources, said second potential being intermediate in value said first and third potentials,
(e) second gate means including a second resistance-diode network,
(f) a first pair of paths extending from said first register element to said first network, each said path being series connected with a diode of said first network,
(g) a second pair of paths extending from said first network to said storage element, each of said second pair of paths being series connected with a diode of said first network,
(h) a third pair of paths extending from said storage element to said second network,
(i) a fourth pair of paths extending from said second network to said second register element, each of said fourth pair of paths being series connected with a diode of said second network.
(j) said first potential being of a value relative to said third potential and to the potentials in said elements,
(i) to reverse bias the diodes in series with both paths of said second pair of paths to disable the first gate means,
(ii) and to forward bias the diode in series with one of said fourth pair of paths to enable the second gate means uni-directionally to drive said second register element to a state determined by the state of the storage element and to continue to urge said second register element to its acquired state,
(k) said second potential being of a value relative to said third potential and to the potentials in said elements
(iii) to reverse bias the diodes in series with both paths of said fourth pair of paths to disable the second gate means,
(iv) and to forward bias the diode in series with one of said first pair of paths, the path thus opened being determined by the state of said first register element,
(l) said third potential being of a value relative to said second potential and to the potentials in said elements
(v) to forward bias the diode in series with one of said second pair of paths, the path thus opened being determined by the opened path of the first pair of paths,
(vi) and to drive said storage element through the opened path of the second pair to a state determined by the state of the first register element.

References Cited by the Examiner

UNITED STATES PATENTS

| | | | |
|---|---|---|---|
| 3,097,312 | 7/1963 | Miller ____________ | 307—88.5 |
| 3,127,535 | 3/1964 | Rabinovici _________ | 307—88.5 |

ARTHUR GAUSS, *Primary Examiner.*

DAVID J. GALVIN, *Examiner.*

J. S. HEYMAN, S. D. MILLER, *Assistant Examiner.*